US009789571B2

(12) United States Patent
Lu

(10) Patent No.: US 9,789,571 B2
(45) Date of Patent: Oct. 17, 2017

(54) AUXILIARY DEVICE FOR INSTALLING PISTON RINGS

(71) Applicant: C.T.I. Traffic Industries Co., Ltd., Tain-Nan (TW)

(72) Inventor: Wan-Chieh Lu, Tai-Nan (TW)

(73) Assignee: C.T.I. Traffic Industries Co., Ltd., Tai-Nan (TW)

( * ) Notice: Subject to any disclaimer, the term of this patent is extended or adjusted under 35 U.S.C. 154(b) by 0 days.

(21) Appl. No.: 15/071,218

(22) Filed: Mar. 16, 2016

(65) Prior Publication Data

US 2017/0028519 A1    Feb. 2, 2017

(30) Foreign Application Priority Data

Jul. 27, 2015    (TW) ............................. 104124276 A

(51) Int. Cl.
*B23P 15/10*    (2006.01)
*B23P 19/08*    (2006.01)
*B23K 37/053*   (2006.01)
*B23Q 1/03*     (2006.01)
*B23Q 1/00*     (2006.01)

(52) U.S. Cl.
CPC ........ *B23P 19/088* (2013.01); *B23K 37/0531* (2013.01); *B23K 37/0538* (2013.01); *B23Q 1/00* (2013.01); *B23Q 1/03* (2013.01)

(58) Field of Classification Search
USPC ......... 29/222, 223, 224, 235, 255, 256, 269, 29/281.1–281.5
See application file for complete search history.

(56) References Cited

U.S. PATENT DOCUMENTS

| 1,525,765 | A | * | 2/1925 | Brenner | ................ | B23P 19/088 29/222 |
| 1,852,613 | A | * | 4/1932 | Jessen | ................... | B23P 19/088 29/222 |
| 2,792,625 | A | * | 5/1957 | Hoffman | ............... | B23P 19/004 29/222 |
| 2,802,709 | A | * | 8/1957 | Heinze | ....................... | F16J 9/00 277/483 |
| 2,818,841 | A | * | 1/1958 | Nichols | ...................... | F16J 9/22 123/41.35 |
| 2,844,422 | A | * | 7/1958 | Wankel | ...................... | F16J 9/20 277/436 |

(Continued)

Primary Examiner — Larry E Waggle, Jr.
Assistant Examiner — Alvin Grant
(74) Attorney, Agent, or Firm — CKC & Partners Co., Ltd.

(57) ABSTRACT

An auxiliary device for installing piston rings is described, which includes a mounting base, a transmission device, a connecting rod and a bracing structure. The mounting base includes a platform, an opening hole and an accommodating space. The transmission device is disposed in the accommodating space and includes a guide screw rod, a sliding base and a motor. The sliding base is slidably screwed on the guide screw rod. The motor can drive the guide screw rod to move the sliding base. The connecting rod is disposed on the sliding base. An external diameter of the piston ring while being put around the connecting rod is greater than an inner diameter of the opening hole. The bracing structure is disposed on the connecting rod. An external diameter of the bracing structure is getting greater from one end connected to the connecting rod. The bracing structure can accommodate the piston.

10 Claims, 6 Drawing Sheets

(56) References Cited

U.S. PATENT DOCUMENTS

| | | | | |
|---|---|---|---|---|
| 2,860,018 A * | 11/1958 | Doperalski | ............ | F04B 39/042 277/456 |
| 2,865,091 A * | 12/1958 | Prucha | ................. | B23P 19/088 29/222 |
| 2,929,174 A * | 3/1960 | Aumiller | ................. | B24B 19/11 451/320 |
| 3,066,398 A * | 12/1962 | Nisper | ................. | B23P 19/088 29/222 |
| 3,186,725 A * | 6/1965 | Wankel | ...................... | F16J 9/14 277/494 |
| 3,195,908 A * | 7/1965 | Hutto | ........................ | F16J 9/20 277/434 |
| 3,299,751 A * | 1/1967 | Coninx | .................... | B23B 5/00 82/114 |
| 3,793,695 A * | 2/1974 | Carter | ................. | B23P 19/088 29/222 |
| 4,047,276 A * | 9/1977 | Albers | ................. | B23P 19/088 29/222 |
| 4,079,661 A * | 3/1978 | Goloff | .................... | B23P 15/10 164/109 |
| 4,314,531 A * | 2/1982 | Bruni | ...................... | F02F 3/08 123/193.4 |
| 4,379,234 A * | 4/1983 | Cruz | ....................... | B23P 19/04 250/559.37 |
| 4,651,631 A * | 3/1987 | Avezou | ................... | B23P 15/10 123/193.6 |
| 4,669,369 A * | 6/1987 | Holt | ...................... | F02F 7/0085 123/193.6 |
| 4,967,459 A * | 11/1990 | Garnier | ................ | B23P 19/003 221/222 |
| 5,259,109 A * | 11/1993 | Fefeu | .................... | B23P 19/088 29/222 |
| 5,303,465 A * | 4/1994 | Fujimoto | .............. | B23P 19/088 29/222 |
| 5,404,629 A * | 4/1995 | Liechty | ................ | B23P 19/088 29/222 |
| 5,737,831 A * | 4/1998 | Liechty | ................ | B23P 19/088 29/222 |
| 6,687,993 B1 * | 2/2004 | Bertin | ................... | B23P 19/043 29/223 |
| 7,757,368 B2 * | 7/2010 | Uemura | ................ | B23P 19/088 29/222 |
| 8,161,630 B2 * | 4/2012 | Takehara | ............... | H02K 15/02 29/596 |
| 8,522,953 B2 * | 9/2013 | Iwamoto | ............... | B23P 19/043 198/345.1 |
| 9,463,540 B2 * | 10/2016 | Jones | .................... | B23P 19/088 |
| 2006/0123610 A1 * | 6/2006 | Haratake | ............... | B23P 19/088 29/222 |

* cited by examiner

AUXILIARY DEVICE FOR INSTALLING PISTON RINGS

RELATED APPLICATIONS

This application claims priority to Taiwan Application Serial Number 104124276, filed Jul. 27, 2015, which is herein incorporated by reference.

BACKGROUND

Field of Invention

The present invention relates to an installing auxiliary device. More particularly, the present invention relates to an auxiliary device for installing piston rings.

Description of Related Art

Pistons are important elements in pneumatic systems or hydraulic systems. A piston ring is typically put around the piston. With the piston ring, the piston can be firmly fastened in a pneumatic cylinder or a hydraulic cylinder, thereby achieving a purpose of seal.

A conventional method for installing a piston ring on a piston is manually operated by operating personnel. The operating personnel slowly embeds the piston ring into a groove on the piston by using manpower directly, so as to position the piston ring on the piston. However, such installing method wastes working time, and easily deforms or fractures the piston ring due to emissness of the operating personnel, thus resulting in increasing of cost.

SUMMARY

Therefore, one objective of the present invention is to provide an auxiliary device for installing piston rings, which can be suitable for pistons and piston rings with various sizes, and can enhance installing efficiency of the piston rings.

According to the aforementioned objectives, the present invention provides an auxiliary device for installing piston rings, which is suitable to put a piston ring around a piston. The auxiliary device for installing piston rings includes a mounting base, a first transmission device, a first connecting rod and a first bracing structure. The mounting base includes a platform, a first opening hole and an accommodating space. The first opening hole communicates with the accommodating space. The first transmission device is disposed in the accommodating space. The first transmission device includes a first guide screw rod, a first sliding base and a first motor. The first sliding base is slidably screwed on the first guide screw rod. The first motor is used to drive and to rotate the first guide screw rod, so as to move the first sliding base to slide on the first guide screw rod. The first connecting rod is disposed on the first sliding base. The first connecting rod passes through the first opening hole and protrudes the platform. The piston ring can be put around the first connecting rod. An external diameter of the piston ring while being put around the first connecting rod is greater than an inner diameter of the first opening hole. The first bracing structure is detachably disposed on the first connecting rod. An external diameter of the first bracing structure is getting greater from one end connected to the first connecting rod to the other end. The first bracing structure has a first placing space for accommodating a piston.

According to an embodiment of the present invention, the first bracing structure is a cone frustum, and the external diameter of the first bracing structure at the end connected to the first connecting rod is substantially the same as an external diameter of the first connecting rod. The external diameter of the first bracing structure at the other end is greater than the external diameter of the first connecting rod.

According to an embodiment of the present invention, the auxiliary device for installing piston rings further includes a controller. The controller is configured to control an operation of the first transmission device.

According to an embodiment of the present invention, the platform has a first mounting opening communicating with the accommodating space. The mounting base further includes a first removable cover plate, and the first removable cover plate is fixed to the platform and covers the first mounting opening. The first opening hole is disposed in the first removable cover plate.

According to an embodiment of the present invention, the auxiliary device for installing piston rings further includes a second transmission device, a second connecting rod and a second bracing structure. The second transmission device is disposed in the accommodating space. The second transmission device includes a second guide screw rod, a second sliding base and a second motor. The second sliding base is slidably screwed on the second guide screw rod. The second motor is used to drive and to rotate the second guide screw rod, so as to move the second sliding base to slide on the second guide screw rod. The second connecting rod is disposed on the second sliding base, passes through a second opening hole of the mounting base and protrudes the platform. The piston ring can be put around the second connecting rod, and the external diameter of the piston ring while being put around the second connecting rod is greater than an inner diameter of the second opening hole. The second bracing structure is detachably disposed on the second connecting rod, wherein an external diameter of the second bracing structure is getting greater from one end connected to the second connecting rod to the other end. The second bracing structure has a second placing space for accommodating the piston.

According to an embodiment of the present invention, the second bracing structure is a cone frustum, and the external diameter of the second bracing structure at the end connected to the second connecting rod is substantially the same as an external diameter of the second connecting rod. The external diameter of the second bracing structure at the other end is greater than the external diameter of the second connecting rod.

According to an embodiment of the present invention, the auxiliary device for installing piston rings further includes a controller. The controller is configured to control an operation of the second transmission device.

According to an embodiment of the present invention, the platform has a second mounting opening communicating with the accommodating space. The mounting base further includes a second removable cover plate. The second removable cover plate is fixed to the platform and covers the second mounting opening. The second opening hole is disposed in the second removable cover plate.

According to an embodiment of the present invention, sizes of the second connecting rod and the second bracing structure are respectively different from sizes of the first connecting rod and the first bracing structure.

According to an embodiment of the present invention, sizes of the second connecting rod and the second bracing structure are substantially the same as sizes of the first connecting rod and the first bracing structure.

According to the aforementioned description, the auxiliary device for installing piston rings of the present invention uses a transmission device to drive a connecting rod and to lift and lower a bracing structure, such that a purpose of automatically installing a piston ring can be achieved, thereby increasing production efficiency and saving labor cost.

Moreover, the installation of the connecting rod and the bracing structure is easy, such that operating personnel can replace the connecting rod and the bracing structure with connecting rods and bracing structures of various sizes according to requirements of pistons and piston rings of various sizes, thereby enhancing utilization benefit of the auxiliary device for installing piston rings.

BRIEF DESCRIPTION OF THE DRAWINGS

The embodiments and the advantages thereof can be more fully understood by reading the following detailed description of the embodiment, with reference made to the accompanying drawings as follows.

DETAILED DESCRIPTION

Figure 1:
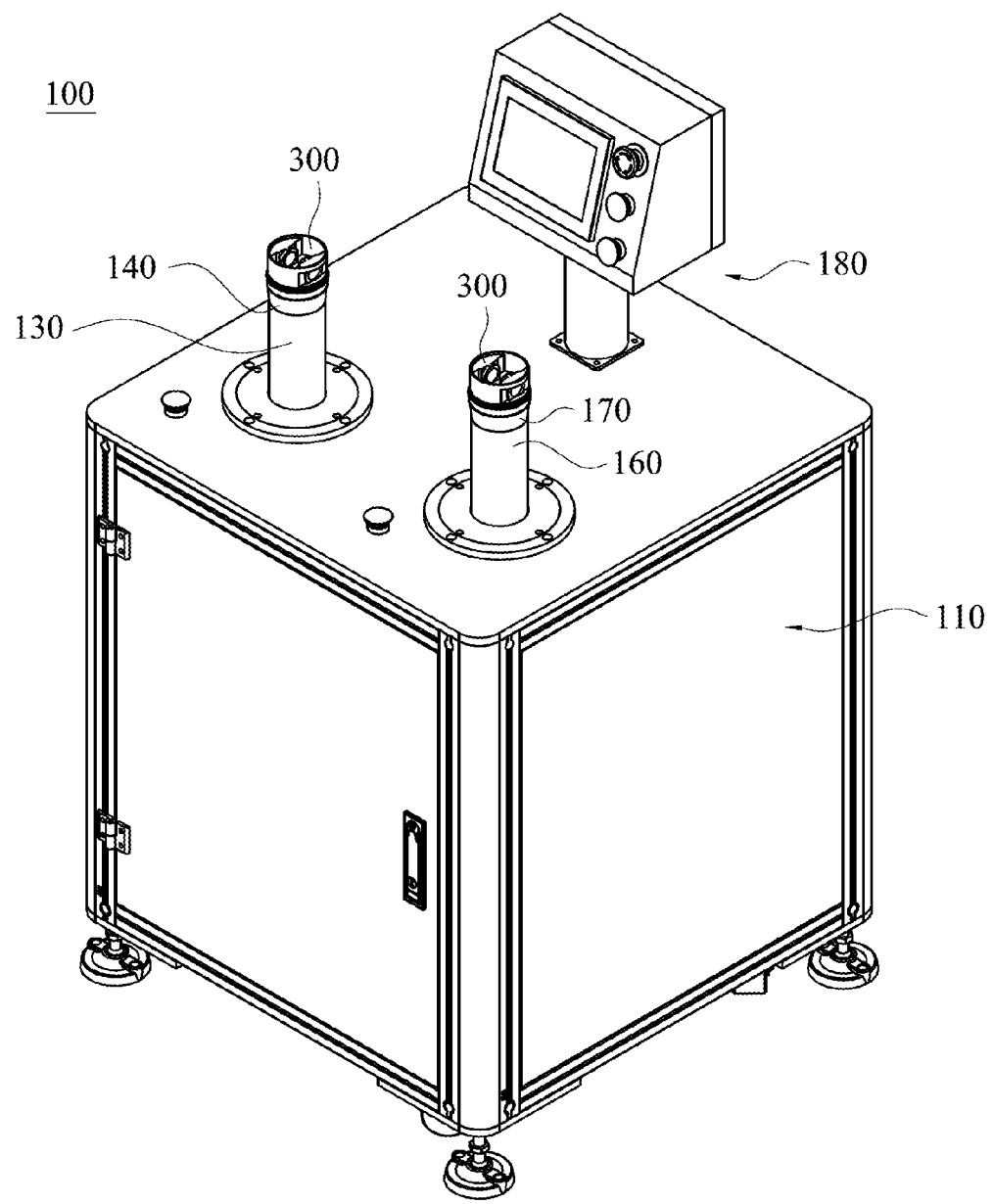
FIG. 1 is a schematic three-dimensional diagram of an auxiliary device for installing piston rings in accordance with a first embodiment of the present invention.
Figure 2:
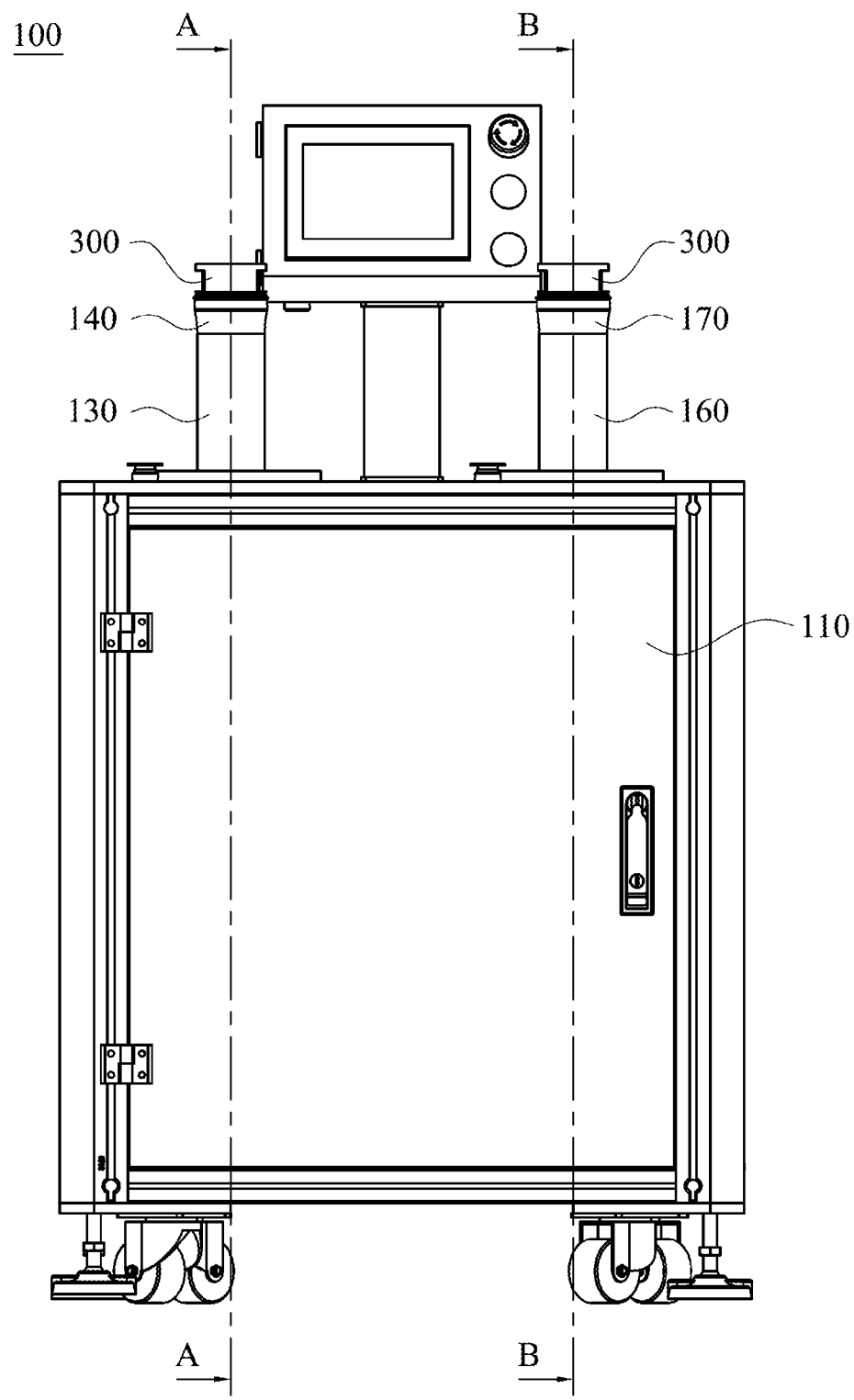
FIG. 2 is a schematic front view of an auxiliary device for installing piston rings in accordance with a first embodiment of the present invention.

Referring to FIG. 1 and FIG. 2, FIG. 1 and FIG. 2 are respectively a schematic three-dimensional diagram and a schematic front view of an auxiliary device for installing piston rings in accordance with a first embodiment of the present invention. An auxiliary device 100 for installing piston rings of the present embodiment is suitable for putting a piston ring 200 (shown in FIG. 4) around a piston 300. It is noted that, in order to illustrate a complete structure of the auxiliary device 100 for installing piston rings clearly and completely, the piston ring 200 is not shown in FIG. 1 and FIG. 2. A detail usage method of the auxiliary device 100 for installing piston rings will be described below.

Figure 3A:
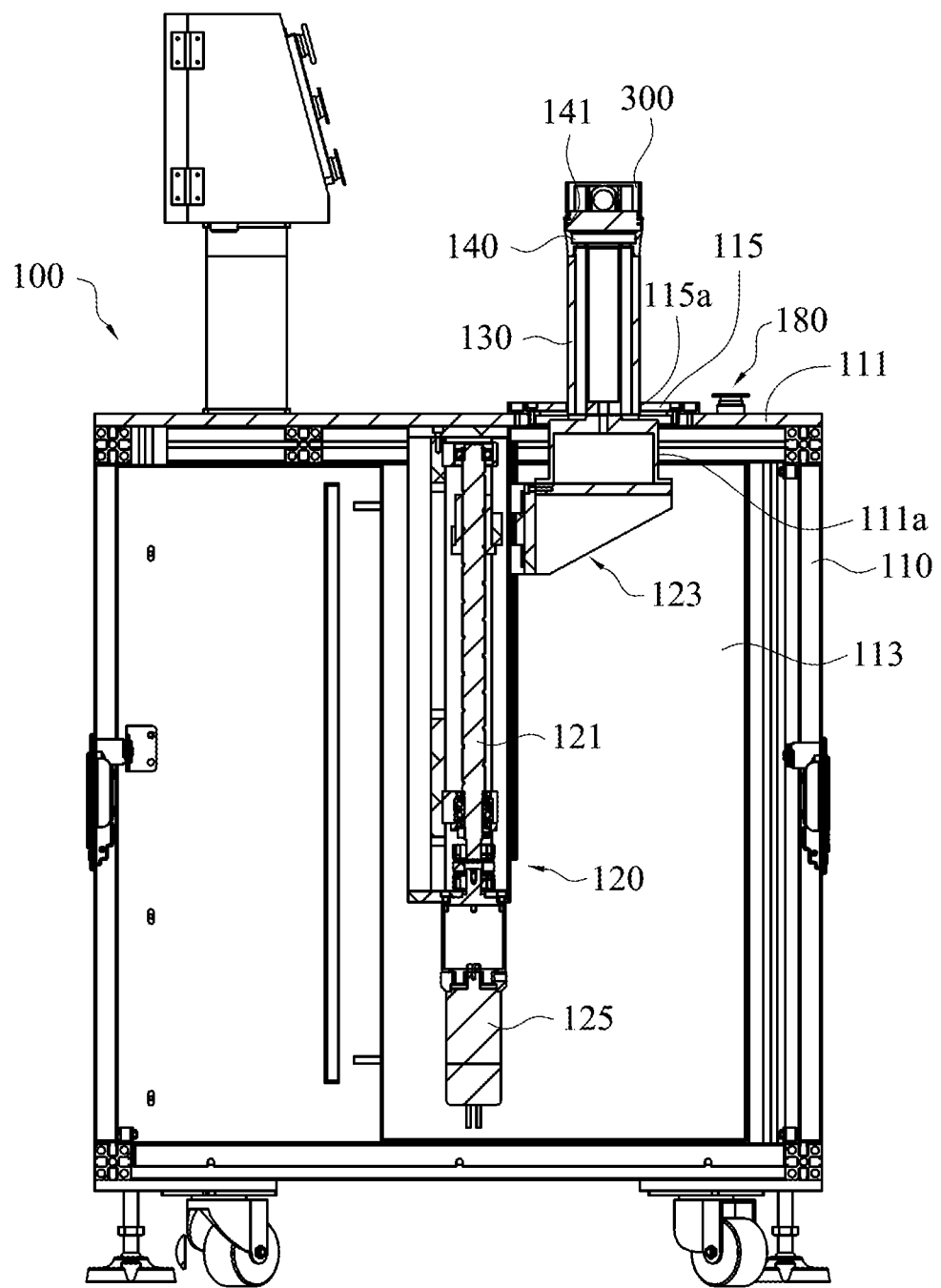
FIG. 3A is a schematic cross-sectional view taken along a line A-A in FIG. 2.
Figure 3B:
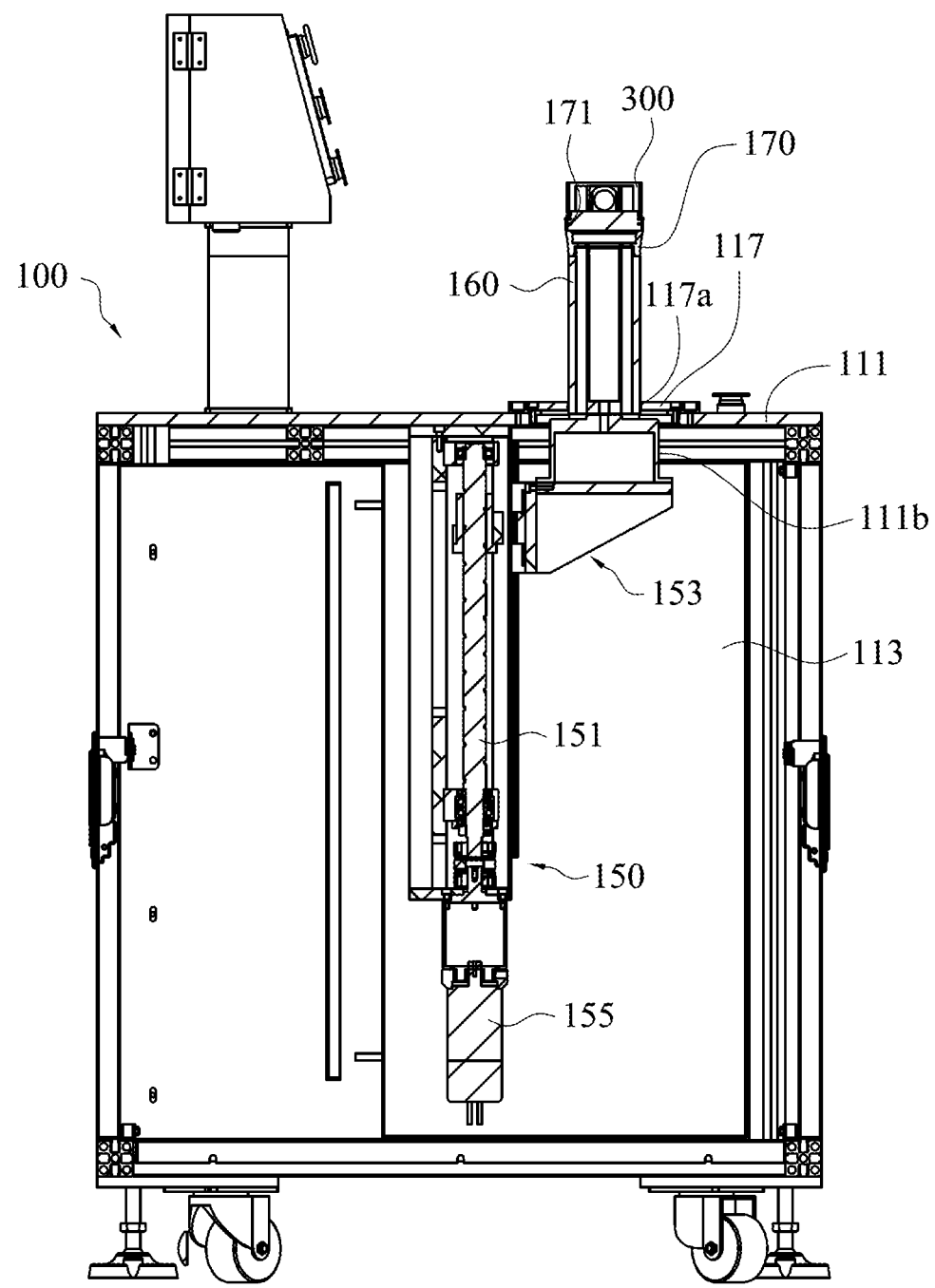
FIG. 3B is a schematic cross-sectional view taken along a line B-B in FIG. 2.

Referring to FIG. 1, FIG. 2, FIG. 3A and FIG. 3B, in which FIG. 3A and FIG. 3B are schematic cross-sectional views taken along a line A-A and a line B-B in FIG. 2 respectively. The auxiliary device 100 for installing piston rings of the present embodiment mainly includes a mounting base 110, a first transmission device 120, a first connecting rod 130, a first bracing structure 140, a second transmission device 150, a second connecting rod 160, a second bracing structure 170 and a controller 180. The first transmission device 120 and the second transmission device 150 are disposed in the mounting base 110. The first connecting rod 130 is disposed on the first transmission device 120, and the first bracing structure 140 is disposed on the first connecting rod 130. The second connecting rod 160 is disposed on the second transmission device 150, and the second bracing structure 170 is disposed on the second connecting rod 160. The piston rings 200 may be put around the first connecting rod 130 and the second connecting rod 160 respectively, and the pistons 300 may be disposed on the first bracing structure 140 and the second bracing structure 170 respectively. In addition, the controller 180 is used to control and drive the first transmission device 120 and the second transmission device 150 respectively or simultaneously, such that the first connecting rod 130 and the first bracing structure 140 are driven by the first transmission device 120, and the second connecting rod 160 and the second bracing structure 170 are driven by the second transmission device 150.

As shown in FIG. 3A, the mounting base 110 is a box, but not limited thereto. The mounting base 110 includes a platform 111, an accommodating space 113 and a first removable cover plate 115. The first transmission device 120 is mainly disposed in the accommodating space 113. The first transmission device 120 includes a first guide screw rod 121, a first sliding base 123 and a first motor 125. The first guide screw rod 121 may be rotatably disposed in the accommodating space 113 through a frame and bearings. The first sliding base 123 is screwed on the first guide screw rod 121. The first motor 125 is connected to the first guide screw rod 121, and can drive the first guide screw rod 121 to rotate. When the first guide screw rod 121 rotates, the first sliding base 123 can slide upwardly and downwardly along the first guide screw rod 121.

Referring to FIG. 3A again, the platform 111 has a first mounting opening 111a which communicates with the accommodating space 113. In the present embodiment, a location of the first mounting opening 111a corresponds to a disposed location of the first sliding base 123. In addition, the first removable cover plate 115 covers the first mounting opening 111a and is fixed to the platform 111. The first removable cover plate 115 has a first opening hole 115a, and the first opening hole 115a corresponds to and communicates with the first mounting opening 111a. As shown in FIG. 3A, the first connecting rod 130 is disposed on the first sliding base 123, passes through the first mounting opening 111a and the first opening hole 115a and protrudes the platform 111. As shown in FIG. 3A, the first bracing structure 140 is detachably disposed on the first connecting rod 130. With such design, when the first motor 125 drives and rotates the first guide screw rod 121, the first connecting rod 130 and the first bracing structure 140 slide upwardly or downwardly as the first sliding base 123 moves.

Figure 4:
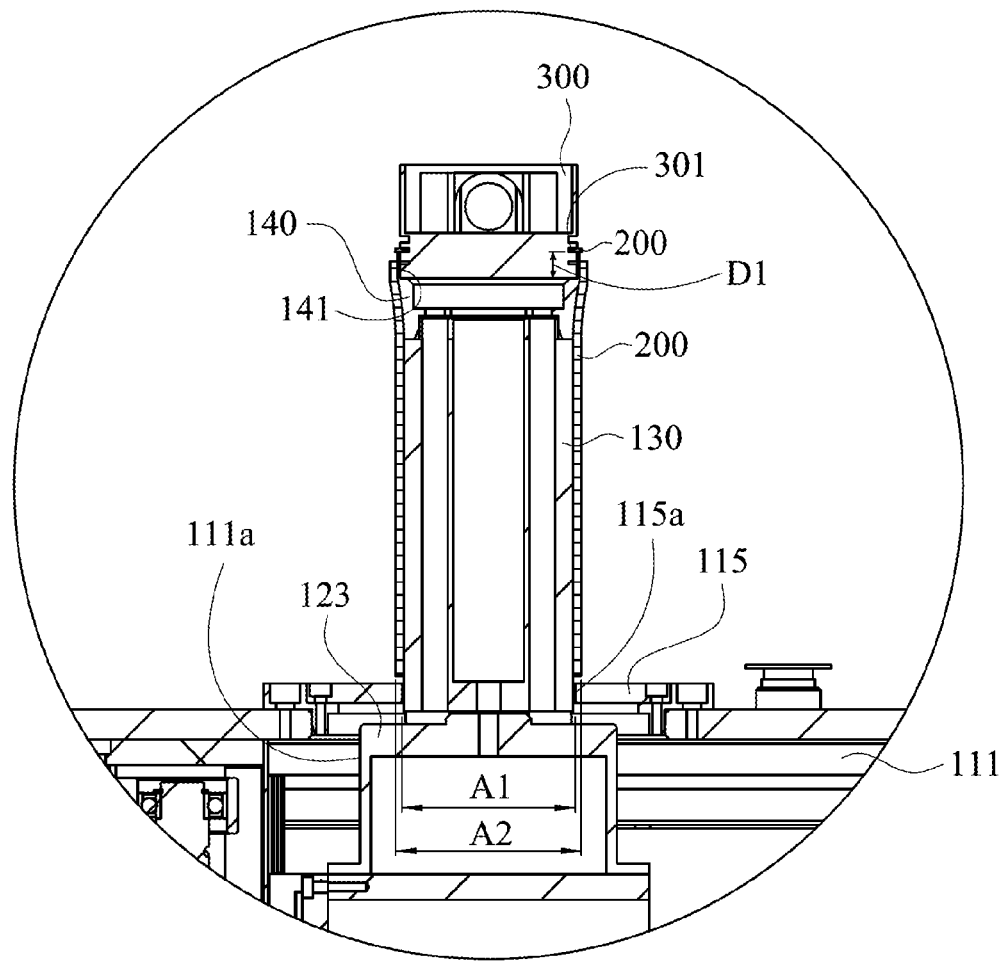
FIG. 4 is a schematic diagram showing a piston ring and a piston disposed on a first connecting rod and a first bracing structure respectively.

Referring to FIG. 3A and FIG. 4 simultaneously, FIG. 4 is a schematic diagram showing a piston ring and a piston disposed on a first connecting rod and a first bracing structure respectively. As shown in FIG. 4, the piston ring 200 is directly put around the first connecting rod 130 and the first bracing structure 140. In addition, an external diameter of the first connecting rod 130 is slightly smaller than an inner diameter A1 of the first opening hole 115a of the first removable cover plate 115. An external diameter A2 of the piston ring 200 while being put around the first connecting rod 130 is greater than the inner diameter A1 of the first opening hole 115a. With such design, when the first connecting rod 130 and the first bracing structure 140 slide downwardly as the first sliding base 123 moves, a top surface of the first removable cover plate 115 applies an action force to the piston ring 200, such that the piston ring 200 is pushed upwardly. In some examples, the inner diameter A1 of the first opening hole 115a of the first removable cover plate 115 is designed according to the external diameter of the first connecting rod 130.

As shown in FIG. 4, the first bracing structure 140 is a cone frustum, and an external diameter of the first bracing structure 140 is getting greater from one end connected to the first connecting rod 130 to the other end. That is, the external diameter of the first bracing structure 140 at the end connected to the first connecting rod 130 is substantially the same as the external diameter of the first connecting rod 130, and the external diameter of the first bracing structure 140 at the other end is greater than the external diameter of the first connecting rod 130. Thus, when the piston ring 200 moves upwardly to the first bracing structure 140, the piston ring 200 can be held open by the first bracing structure 140. In addition, a top end of the first bracing structure 140 has a first placing space 141. The first placing space 141 can be used to accommodate the piston 300. The piston 300 has a groove 301 for accommodating the piston ring 200. When the piston 300 is placed in the first placing space 141, the groove 301 of the piston 300 is outside of the first placing space 141. Thus, when the piston ring 200 is pushed upwardly by the action force from the first removable cover plate 115, the piston ring 200 at the top end of the first bracing structure 140 moves toward the piston 300 and disengages from the first bracing structure 140 to embed into the groove 301 of the piston 300. It is noted that, in the present embodiment, a depth D1 of the first placing space 141 may be designed according to a location of the groove 301 of the piston 300. That is, different first bracing structures 140 may have first placing spaces 141 of different depths D1. Thus, the operating personnel can select and change the first bracing structures 140 having the first placing spaces 141 of different depths D1.

Referring to FIG. 3B, the second transmission device 150 is similarly disposed in the accommodating space 113 of the mounting base 110. The second transmission device 150 includes a second guide screw rod 151, a second sliding base 153 and a second motor 155. The second guide screw rod 151 may be rotatably disposed in the accommodating space 113 through a frame and bearings. The second sliding base 153 is screwed on the second guide screw rod 151. The second motor 155 is connected to the second guide screw rod 151, and can drive the second guide screw rod 151 to rotate. When the second guide screw rod 151 rotates, the second sliding base 153 can slide upwardly and downwardly along the second guide screw rod 151.

Referring to FIG. 3B again, the platform 111 has a second mounting opening 111*b* which communicates with the accommodating space 113. In the present embodiment, a location of the second mounting opening 111*b* corresponds to a disposed location of the second sliding base 153. In addition, the mounting base 110 further includes a second removable cover plate 117. The second removable cover plate 117 covers the second mounting opening 111*b* and is fixed to the platform 111. The second removable cover plate 117 has a second opening hole 117*a*, and the second opening hole 117*a* corresponds to and communicates with the second mounting opening 111*b*. As shown in FIG. 3B, the second connecting rod 160 is disposed on the second sliding base 153, passes through the second mounting opening 111*b* and the second opening hole 117*a* and protrudes the platform 111. As shown in FIG. 3B, the second bracing structure 170 is detachably disposed on the second connecting rod 160. With such design, when the second motor 155 drives and rotates the second guide screw rod 151, the second connecting rod 160 and the second bracing structure 170 slide upwardly or downwardly as the second sliding base 153 moves.

Similarly, the piston ring 200 is directly put around the second connecting rod 160 and the second bracing structure 170. In addition, an external diameter of the second connecting rod 160 is slightly smaller than an inner diameter of the second opening hole 117*a* of the second removable cover plate 117. An external diameter of the piston ring 200 while being put around the second connecting rod 160 is greater than the inner diameter of the second opening hole 117*a*. With such design, when the second connecting rod 160 and the second bracing structure 170 slide downwardly as the second sliding base 153 moves, a top surface of the second removable cover plate 117 applies an action force to the piston ring 200, such that the piston ring 200 is pushed upwardly. In some examples, the inner diameter of the second opening hole 117*a* of the second removable cover plate 117 is designed according to the external diameter of the second connecting rod 160.

As shown in FIG. 3B, the second bracing structure 170 is a cone frustum, and an external diameter of the second bracing structure 170 is getting greater from one end connected to the second connecting rod 160 to the other end. That is, the external diameter of the second bracing structure 170 at the end connected to the second connecting rod 160 is substantially the same as the external diameter of the second connecting rod 160, and the external diameter of the second bracing structure 170 at the other end is greater than the external diameter of the second connecting rod 160. Thus, when the piston ring 200 moves upwardly to the second bracing structure 170, the piston ring 200 can be held open by the second bracing structure 170. In addition, a top end of the second bracing structure 170 has a second placing space 171. The second placing space 171 can be used to accommodate the piston 300. The groove 301 (as shown in FIG. 4) of the piston 300 for accommodating the piston ring 200 is outside of the second placing space 171. Thus, when the piston ring 200 is pushed upwardly by the action force from the second removable cover plate 117, the piston ring 200 at the top end of the second bracing structure 170 moves toward the piston 300 and disengages from the second bracing structure 170 to embed into the groove 301 of the piston 300. It is noted that, in the present embodiment, a depth of the second placing space 171 may be designed according to a location of the groove 301 of the piston 300. Similarly, different second bracing structures 170 may have second placing spaces 171 of different depths. Thus, the operating personnel can select and change the second bracing structures 170 having the second placing spaces 171 of different depths.

In some examples, sizes of the second connecting rod 160 and the second bracing structure 170 can be designed to be respectively the same as or different from sizes of the first connecting rod 130 and the first bracing structure 140, so as to meet requirements of piston rings 200 and pistons 300 of various sizes. The first connecting rod 130, the first bracing structure 140, the second connecting rod 160 and the second bracing structure 170 of the present application are outside of the platform 111, such that it is convenient to the operating personnel to quickly disassemble the first connecting rod 130, the first bracing structure 140, the second connecting rod 160 and the second bracing structure 170, or replace the first connecting rod 130, the first bracing structure 140, the second connecting rod 160 and the second bracing structure 170 with another first connecting rod 130, another first bracing structure 140, another second connecting rod 160 and another second bracing structure 170 of different sizes. In addition, the sizes of the first opening hole 115*a* of the first removable cover plate 115 and the second opening hole 117*a* of the second removable cover plate 117 are designed according to the external diameters of the first connecting rod 130 and the second connecting rod 160 respectively, such that when the first connecting rod 130 and the second connecting rod 160 are replaced, only the first removable cover plate 115 and the second removable cover plate 117 need to be replaced with another first removable cover plate 115 having a first opening hole 115a of a different size and another second removable cover plate 117 having a second opening hole 117a of a different size.

In addition, the first bracing structure 140 and the second bracing structure 170 are detachable. Thus, before the piston rings 200 to be installed are disposed on the first connecting rod 130 and the second connecting rod 160, the first bracing structure 140 and the second bracing structure 170 can be disassembled firstly, and the piston rings 200 are directly put around the first connecting rod 130 and the second connecting rod 160 by a vertically disposing method. Then, the first bracing structure 140 and the second bracing structure 170 are mounted onto the first connecting rod 130 and the second connecting rod 160. Subsequently, the controller 180 is used to control the first connecting rod 130 and the second connecting rod 160 to move downwardly, and the piston rings 200 are pushed to move to the first bracing structure 140 and the second bracing structure 170 individually, thereby achieving a purpose of saving preparation time.

Figure 5:
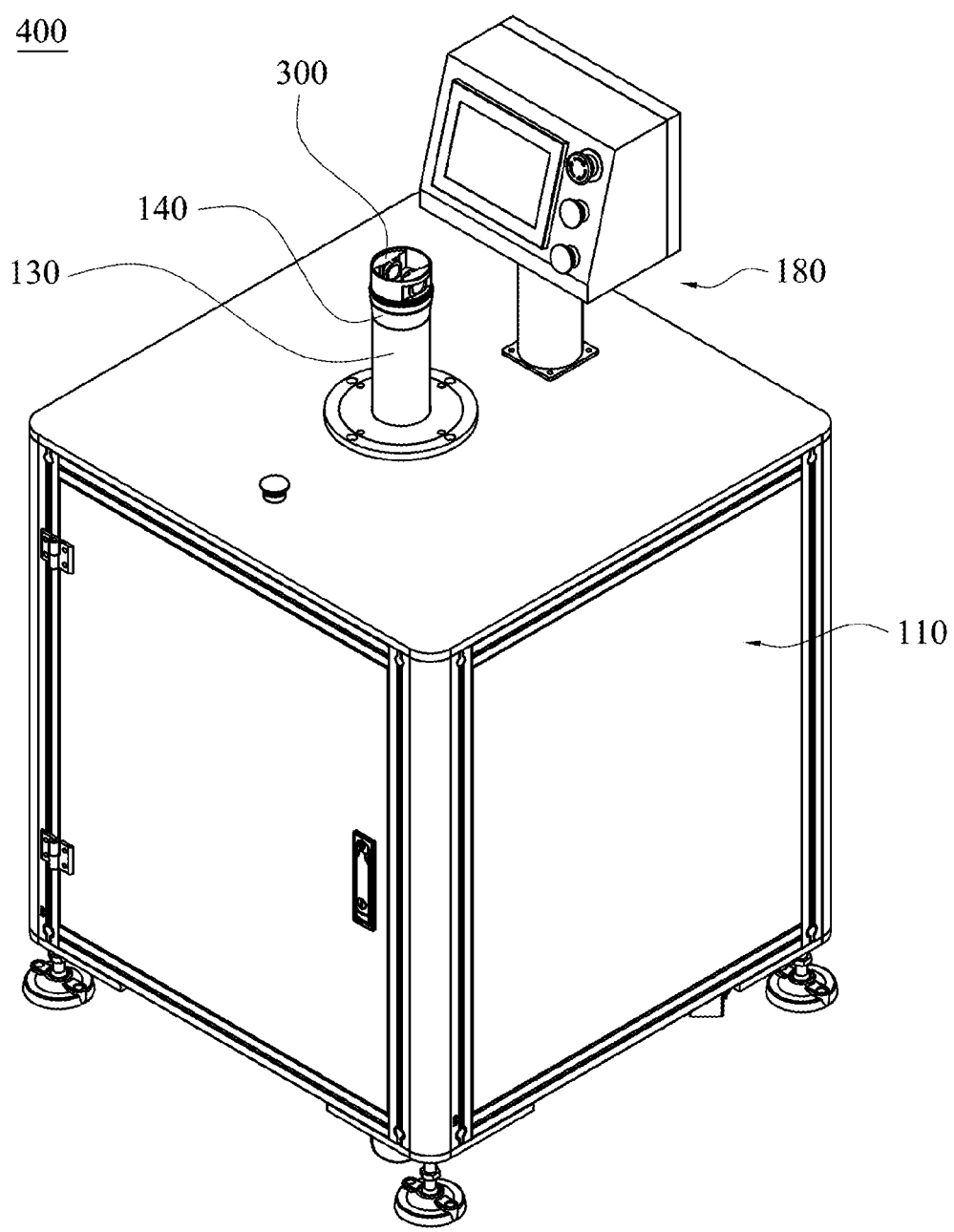
FIG. 5 is a schematic three-dimensional diagram of an auxiliary device for installing piston rings in accordance with a second embodiment of the present invention.

It is noted that, the auxiliary device for installing piston rings of the present invention may have different structure designs. Referring to FIG. 5, FIG. 5 is a schematic three-dimensional diagram of an auxiliary device for installing piston rings in accordance with a second embodiment of the present invention. A structure of an auxiliary device for installing piston rings 400 shown in FIG. 5 is substantially the same as that of the aforementioned auxiliary device for installing piston rings 100, and differences between the auxiliary device for installing piston rings 400 and the auxiliary device for installing piston rings 100 are that the auxiliary device for installing piston rings 400 only has a first transmission device 120, a first connecting rod 130 and a first bracing structure 140 as shown in FIG. 3A, and does not have a second transmission device 150, a second connecting rod 160 and a second bracing structure 170 as shown in FIG. 3B for meeting a use requirement of small-scale production and cost consideration.

According to the aforementioned embodiments of the present invention, the auxiliary device for installing piston rings of the present invention uses a transmission device to drive a connecting rod and to lift and lower a bracing structure, such that a purpose of automatically installing a piston ring can be achieved, thereby increasing production efficiency and saving labor cost.

Moreover, the installation of the connecting rod and the bracing structure is easy, such that operating personnel can replace the connecting rod and the bracing structure with connecting rods and bracing structures of various sizes according to requirements of pistons and piston rings of various sizes, thereby enhancing utilization benefit of the auxiliary device for installing piston rings.

Although the present invention has been described in considerable detail with reference to certain embodiments thereof, the foregoing embodiments of the present invention are illustrative of the present invention rather than limiting of the present invention. It will be apparent to those having ordinary skill in the art that various modifications and variations can be made to the present invention without departing from the scope or spirit of the invention. Therefore, the spirit and scope of the appended claims should not be limited to the description of the embodiments contained herein.

What is claimed is:

1. An auxiliary device for installing piston rings, and suitable for placing a piston ring around a piston, the device comprising:
   a mounting base comprising a platform, a first opening hole and an accommodating space, wherein the first opening hole communicates with the accommodating space;
   a first transmission device disposed in the accommodating space, wherein the first transmission device comprises:
   a first guide screw rod;
   a first sliding base slidably screwed on the first guide screw rod; and
   a first motor used to drive and to rotate the first guide screw rod, so as to move the first sliding base to slide downwardly and upwardly on the first guide screw rod;
   a first connecting rod disposed on the first sliding base, passing through the first opening hole and protruding from the platform, wherein the piston ring can be placed around the first connecting rod, and an external diameter of the piston ring while being placed around the first connecting rod is greater than an inner diameter of the first opening hole, wherein when the first connecting rod slides downwardly as the first sliding base moves, a top surface of the mounting base applies an action force to the piston ring, such that the piston ring can be pushed upwardly; and
   a first bracing structure detachably disposed on the first connecting rod, wherein an external diameter of the first bracing structure increases from one end connected to the first connecting rod to the other end, and the first bracing structure has a first placing space for accommodating the piston.

2. The auxiliary device for installing piston rings of claim 1, wherein the first bracing structure is a cone frustum, the external diameter of the first bracing structure at the end connected to the first connecting rod is substantially the same as an external diameter of the first connecting rod, and the external diameter of the first bracing structure at the other end is greater than the external diameter of the first connecting rod.

3. The auxiliary device for installing piston rings of claim 1, further comprising a controller configured to control an operation of the first transmission device.

4. The auxiliary device for installing piston rings of claim 1, wherein
   the platform has a first mounting opening communicating with the accommodating space; and
   the mounting base further comprises a first removable cover plate fixed to the platform and covering the first mounting opening, and the first opening hole is disposed in the first removable cover plate.

5. The auxilialy device for installing piston rings of claim 1, further comprising:
   a second transmission device disposed in the accommodating space, wherein the second transmission device comprises:
   a second guide screw rod;
   a second sliding base slidably screwed on the second guide screw rod; and
   a second motor used to drive and to rotate the second guide screw rod, so as to move the second sliding base to slide downwardly and upwardly on the second guide screw rod;
   a second connecting rod disposed on the second sliding base, passing through a second opening hole of the mounting base and protruding from the platform, wherein the piston ring can be placed around the second connecting rod, and the external diameter of the piston ring while being placed around the second connecting rod is greater than an inner diameter of the second opening hole, wherein when the second connecting rod slides downwardly as the second sliding base moves the top surface of the mounting base applies an action force to the piston ring, such that the piston ring can be pushed upwardly; and a second bracing structure detachably disposed on the second connecting rod, wherein an external diameter of the second bracing structure increases from one end connected to the second connecting rod to the other end, and the second bracing structure has a second placing space for accommodating the piston.

6. The auxiliary device for installing piston rings of claim 5, wherein the second bracing structure is a cone frustum, the external diameter of the second bracing structure at the end connected to the second connecting rod is substantially the same as an external diameter of the second connecting rod, and the external diameter of the second bracing structure at the other end is greater than the external diameter of the second connecting rod.

7. The auxiliary device for installing piston rings of claim 5, further comprising a controller configured to control an operation of the second transmission device.

8. The auxiliary device for installing piston rings of claim 5, wherein
the platform has a second mounting opening communicating with the accommodating space; and
the mounting base further comprises a second removable cover plate fixed to the platform and covering the second mounting opening, and the second opening hole is disposed in the second removable cover plate.

9. The auxiliary device for installing piston rings of claim 5, wherein sizes of the second connecting rod and the second bracing structure are respectively different from sizes of the first connecting rod and the first bracing structure.

10. The auxiliary device for installing piston rings of claim 5, wherein sizes of the second connecting rod and the second bracing structure are substantially the same as sizes of the first connecting rod and the first bracing structure.

* * * * *